United States Patent [19]

Layman

[11] Patent Number: 5,263,174
[45] Date of Patent: Nov. 16, 1993

[54] METHODS FOR QUICK SELECTION OF DESIRED ITEMS FROM HIERARCHICAL COMPUTER MENUS

[75] Inventor: Andrew J. Layman, San Francisco, Calif.

[73] Assignee: Symantec Corporation, Cupertino, Calif.

[21] Appl. No.: 993,900

[22] Filed: Dec. 18, 1992

Related U.S. Application Data

[63] Continuation of Ser. No. 659,527, Feb. 22, 1991, abandoned, which is a continuation of Ser. No. 176,788, Apr. 1, 1988, abandoned.

[51] Int. Cl.⁵ .............................................. G06F 3/14
[52] U.S. Cl. .......................... 395/800; 364/DIG. 1; 364/222.81; 364/222.9; 364/286; 364/140; 395/156; 395/160
[58] Field of Search ............... 395/800, 600, 725, 160, 395/155; 340/710, 711; 390/709; 364/140

[56] References Cited

U.S. PATENT DOCUMENTS

| | | | |
|---|---|---|---|
| 4,481,603 | 11/1984 | McCaskill et al. | 364/906 |
| 4,507,734 | 3/1985 | Kaldas | 364/419 |
| 4,601,003 | 7/1986 | Yoneyama et al. | 364/518 |
| 4,674,043 | 6/1987 | Hernandez et al. | 364/401 |
| 4,751,674 | 6/1988 | Aoyagi et al. | 364/900 |
| 4,862,390 | 8/1989 | Weiner | 364/521 |
| 4,879,648 | 11/1989 | Cochran et al. | 395/275 |
| 5,072,367 | 12/1991 | Clayton et al. | 395/600 |

OTHER PUBLICATIONS

Cornerstone Database Management Software Manual, and Program Print Screen Infocom, Inc, 1985-1986, pp. 13-23.
Proximity Technology Inc., *Friendly Finder*, 1987, Manual pp. 1-26; Diskette containing software.
Andrew Layman and Breakthrough Software Corp., TimeLine Ver. 2.0, 1985. Manual; 2 diskettes.

*Primary Examiner*—Lawrence E. Anderson
*Assistant Examiner*—Mehmet Geckil
*Attorney, Agent, or Firm*—ALbert C. Smith; Wayne P. Sobon; Edward J. Radlo

[57] ABSTRACT

A method of conveniently making a selection from a set of options available in a computer program is described. As successive letters which make up the proposed selection are entered, successively smaller lists of options corresponding to the entered letters are displayed. At any point, the user makes a selection by moving a cursor to a desired selection and pressing a button or key to indicate that the selection has been made.

20 Claims, 2 Drawing Sheets

```
edibles─1
    fruits─2
        apple─4
        pear─5
    vegetables─3
        potato─6
        rutabega─7
```

```
edibles─1
    fruits─2
        Pear─5
    vegetables─3
        Potato─6
```

```
edibles─1
    vegetables─3
        POtato─6
```

```
┌──────────────┐  ┌──────────────┐  ┌──────────────┐  ┌──────────────┐
│ Peach        │  │ PEach        │  │ PEAch        │  │ PEACh        │
│ Pear         │  │ PEar         │  │ PEAr         │  │              │
│ Persimmon    │  │ PErsimmon    │  │              │  │              │
└──────────────┘  └──────────────┘  └──────────────┘  └──────────────┘
```

Figure 1a    Figure 1b    Figure 1c    Figure 1d edibles —1
    fruits —2
        apple —4
        pear —5
    vegetables —3
        potato —6
        rutabega —7

Figure 2a edibles —1
  fruits —2
    Pear —5
  vegetables —3
    Potato —6 edibles —1
  vegetables —3
    POtato —6

Figure 2b        Figure 2c

METHODS FOR QUICK SELECTION OF DESIRED ITEMS FROM HIERARCHICAL COMPUTER MENUS

This is a file wrapper continuation application of U.S. patent application Ser. No. 07/659,527, filed Feb. 22, 1991, now abandoned which was a File Wrapper continuation of application Ser. No. 07/176,788 filed on Apr. 1, 1988, now abandoned.

BACKGROUND OF THE INVENTION

This invention relates to computer programs which require the user to make a selection or command from a set of valid entries.

Many times, when working with a computer application, users are called upon to select a particular item from a list, menu, table, or outline of possible choices. Examples include locating records in a data table, selecting a name or phrase from a long list of candidates, or choosing a command from a specified set. The simplest method to effect this operation has been to simply require the user to type in the desired selection.

Some designers have attempted to make this process more convenient by allowing the user to indicate one choice from among many by moving the computer s cursor to the desired item and then pressing a special key to indicate that the item at the cursor is to be selected. The cursor may be moved by keyboard, mouse, pointing device, or other means, and the selection can either pick out the indicated item, or perform some other action on it.

Other applications have provided the possibility whereby a truncated version or abbreviation of a desired command may be entered thus making the selection with fewer keystrokes. Some word processing programs also provide for the method by which the user may enter only part of a desired word whereupon the computer moves the cursor to the first located section of text which matches the partial entry.

SUMMARY OF THE INVENTION

The present invention provides a method of programming and using a computer whereby successive keystrokes entered by the user will cause the display of a list which dynamically reflects the range of choices corresponding to the letters entered thus far. As each letter is entered, the set of choices which corresponds to the letters entered thus far is immediately reduced. Only the items whose names match the fragment which has been entered remained displayed, and the matching letters of the displayed items are highlighted. All other items vanish from view. The cursor keys remain active over the reduced list, allowing the user to continue typing letters, or to move the cursor to a particular selection within the list and press a pre-designated key to finish the selection.

This method allows the user to enter a selection by keyboard, by cursor movement, or by a combination of the two all while dynamically reflecting the progress and range of remaining choices as the user proceeds.

BRIEF DESCRIPTION OF THE DRAWINGS

FIGS. 1a, 1b, 1c, and 1d depict displays of lists selected according one embodiment of the present invention.

FIGS. 2a, 2b, and 2c depict displays of lists organized in outline form and selected according to another embodiment of the present invention.

DETAILED DESCRIPTION OF THE INVENTION

Figure 3:
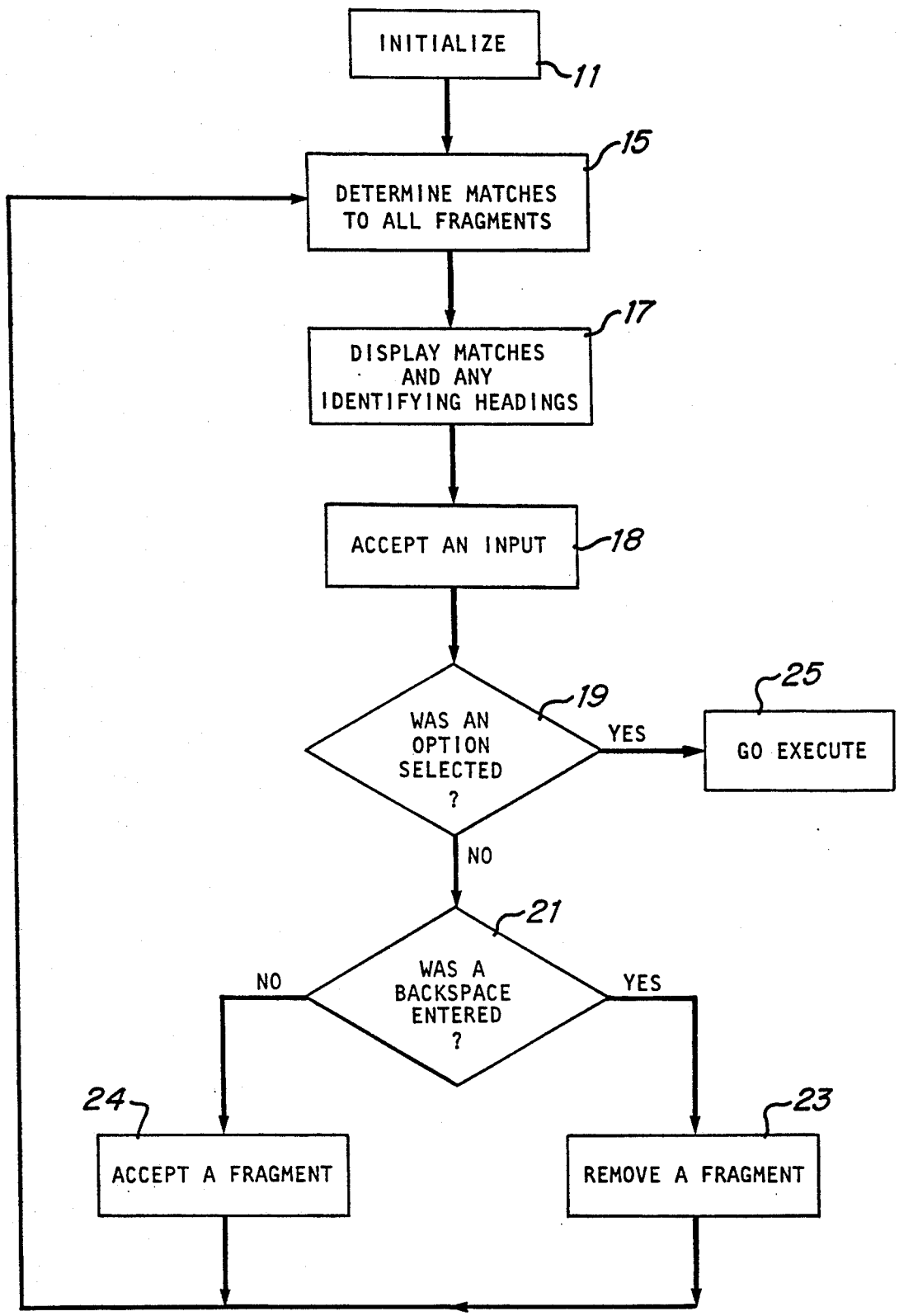
FIG. 3, is an outline, in flow chart form, of the algorithm of the present invention.

The method described herein is intended for use on a computer. Typically, such a computer will include a central processing unit having a memory for data and instructions and a processor. Such a computer will also include a display means, such as a video monitor or liquid crystal display, and an input means, such as a keyboard, mouse, or voice input device.

The specific embodiment described below pertains to the selection of a word from among a list of words. Thus, in this case, the "options" which a user is choosing among are the words in the list. The selection is made by entering "fragments", in this case letters, in succession.

The invention described herein may also be applied to other cases in which the options are words, such as choosing a command or search term in a database. Moreover, larger or non-verbal items may be used as the "options", in which case the fragments used to select from among the options may be Boolean operands, pictoral elements, or word combinations, for example.

Turning to FIGS. 1a through 1d, the method of choosing a word from a list is illustrated. As letters are typed, they are determined by any matching or sorting method to match portions of the items in a list. The typed letters or word fragments are indicated within each listed item by displaying the letters which match in a different video mode, font, or case from the remaining unmatched letters. The entry of each successive letter causes the displayed list of possible entries to be reduced to reflect the restricted range of entries which may match the fragment which has been entered so far.

For example, if a list consisted of: Apple, Peach, Pear, Persimmon, Rutabaga, typing P, then E, then A, then C, would reduce the list and display, successively, the four screens shown in FIGS. 1a through 1d. In FIG. 1a, capitalization of the letter P in each word displayed corresponds to the input letter, and the words Apple and Rutabaga are never displayed. In FIGS. 1b, the letters P and E are capitalized in each displayed word. In FIG. 1c, the input of the letter A, to form the fragment PEA, causes those corresponding letters to be capitalized and causes the word persimmon to be eliminated. Finally, entering the letter C causes only one word to be displayed in FIG. 1d, Peach, the user may select this option by pressing an appropriate key on a keyboard.

Generally, matching proceeds from left to right, selecting only items whose names begin with the letters so far typed. Occasionally, however, particularly when the user's emphasis is more on reducing the amount of typing, it may be advantageous to match a sequence of letters found anywhere in the name. This may be indicated by prefacing the search process by pressing a special key or otherwise altering the matching criteria. Even in this situation, the highlighting of the matched letters within the text of each matching item name is applicable.

Where the entry of fragments has proceeded to the point where all desirable candidates have been eliminated, the user may backspace or otherwise delete a portion of the entry or fragment. In one embodiment of this invention, the displayed list will respond by expanding to reflect the larger set of entries which match the fragment. An example of such a process would be found where, from FIG. 1d, the user backspaced so as to eliminate the letter C from the entered fragment. The result would be the larger subset in the display depicted in FIG. 1c.

When the items among which the selection is to be made are organized in an outline, one embodiment of the invention continues to display the headings of each branch and sub-branch which contains a selected item. As with the previous embodiment, members of the set which do not match the fragment which has been entered, are deleted from the display.

For example, where a list of foods is organized as depicted in FIG. 2a, the entry of the letters P then O would reduce the outline to those depicted in FIGS. 2b and 2c respectively. FIG. 2a consists of a heading 1 and two subheadings 2, 3 each of which contains two entries 4, 5, 6, 7. Turning to FIG. 2b, when the letter P is typed, one entry 4, 7 under each of the subheadings 2, 3 is deleted as not beginning with the letter P. Since each of the subheadings 2, 3 contains a possible valid entry 5, 6, neither is deleted.

Looking at FIG. 2c, where the letter O has been typed, it made be seen that only the word potato 6 satisfies the fragment which has been entered. Thus, the subheading 2 which contains no valid entry has been deleted leaving only the heading 1 and subheading 3 which contain the word potato 6. It is believed that this ability to show the progress of a narrowing search, in context, is an advantage of this new selection method.

It will be appreciated by those skilled in the art that, in some instances, the entry of a command fragment by keyboard will not be immediately feasible since, as in a word processing program, the normal mode of input is to enter words by keyboard. In such a case, the user must first give a command that either establishes a mode that causes a list to act in the narrowing search behavior described herein or creates a new copy of the list or outline with any previously hidden items showing. It may be convenient in such an embodiment to provide that the selection of an item returns the cursor to the original application if appropriate.

Turning now to FIG. 3, the algorithm of an embodiment of the present invention is represented in flowchart form. Commencing at node 11, it is necessary to place the processor in an initial state where the entire set of appropriate options is accessible.

At node 15 it is determined which options in the set of options correspond to the group of fragments which have been entered thus far. Execution proceeds to node 17, which calls for a display of all matching options. Where no fragments have been entered, the display logic may be configured to show all options as "matching" or no options at all. Where, as in the example illustrated by FIGS. 2a through 2c, there are headings associated with the options, they may be displayed as well.

Options which do not match may be omitted or, space permitting, may be displayed in a visually distinct manner so as to indicate their status.

At node 18, an input is required. This may be either a backspace type key, a first or additional fragment, or the indication that a selection has been made. At node 19 it may be detected that an option has been selected, either by pressing a designated key or by moving a cursor to one among the remaining options and indicating the selection. If a selection was made, the identity of the selected option is made available to the application program for regular handling by branching to whatever execution code is provided at node 25.

Otherwise, the input is tested at node 21 to see if a backspace was entered. If a backspace is detected, a fragment is removed at node 23 from those being used to determine which options are to be displayed. If there was no backspace, a fragment is added to the set which is being matched at node 24. Each node 23, 24 branches back to node 15 to determine the new set of matching options.

PROGRAM LISTING

Below is a listing of a routine embodying the present invention. The routine is written in the language Modula-2.

```
PROCEDURE GoToViewDisplay(    GoToView  : XGoToView);

VAR
    s, s1                     : ARRAY [0..80] OF CHAR;
    Leader                    : CARDINAL;
    Count                     : CARDINAL;
    mode1                     : avidmode;
    mode2                     : avidmode;
    i                         : CARDINAL;
    FillLength                : CARDINAL;

BEGIN                         (* GoToViewDisplay *)

(*<DEBUGGING*)
    IF (AnxietyLevel > Calm) THEN
        ValidateGoToView(AGoToView(GoToView));
    END;
    (*DEBUGGING>*)

WITH GoToView^ DO
        IF (NOT (NeedsRedisplay IN Status)) THEN RETURN END;

mode1 := VideoMode;
        mode2 := VideoMode;
```

```
        IF (CursorOn IN Status) THEN
            mode1 := CursorMode;
            INC (mode1);
            mode2 := CursorMode;
            INC (mode2);
        END;

IF (ViewObject = NIL) THEN
            Fill (s, " ", Lrx-Ulx+1);
            SetLengthOf (s1, 0);
            Count := 0;
            Leader := 0;
        ELSE
            FormatIndentation (ViewObject, Lrx-Ulx+1, s1);
            ConcatS (s1, " ");
            Count := ParentView^.Methods^.GetMatchCount (ParentView);
            BaseView^.Methods^.GetTitle (AnActiveView (GoToView), s);
            Leader := LengthOf(s1);

IF (ViewObject^.Methods^.TestAttributeBit (ViewObject, TypeThroughEnable)) AND
               (ViewObject^.Methods^.TestAttributeBit (ViewObject, SelfMatch)) THEN
                IF (CursorOn IN Status) THEN
                    mode1 := videosecondarycursor;
                ELSE
                    mode1 := videoenhance;
                    mode2 := videofilter1;
                END;
            ELSE
                Count := 0;
            END;

ConcatLS (s1, s);
            SetLengthOf (s1, Count+Leader);
            Remove (s, 1, Count);

IF (Count+Leader > Lrx-Ulx+1) THEN
                SetLengthOf (s1, Lrx-Ulx+1);
                SetLengthOf (s, 0);
                Count := 0;
                Leader := 0;
            ELSE
                FillLength := Lrx-Ulx+1-Leader-Count;
                IF (LengthOf (s) > FillLength) THEN
                    SetLengthOf (s, FillLength);
                ELSE
                    FOR i := 1 TO FillLength-LengthOf(s) DO
                        ConcatS (s, " ");
                    END;
                END;
            END;
        END;

PutString (s1, Ulx, Uly, VideoMode);
        PutAttribute (Ulx+Leader, Uly, Count, mode1);
        PutString (s, Ulx+Count+Leader, Uly, mode2);

EXCL(Status, NeedsRedisplay);
    END;

END GoToViewDisplay;

PROCEDURE OutlineViewResetMatching (OutlineView        : XOutlineView);
VAR
    Node        : ATreeNode;
    Name        : ARRAY [0..80] OF CHAR;
BEGIN (*<DEBUGGING*)
    IF (AnxietyLevel > Calm) THEN
        ValidateOutlineView(AnOutlineView(OutlineView));
    END;
```

```
(*DEBUGGING>*)

WITH OutlineView^ DO
    IF (NOT TypeThroughEnabled) THEN
        RETURN;
    END;

MatchCodeSet := EmptyCodeSet;
    Node := ViewObject^:Methods^.GetFirst (ViewObject);

WHILE (Node <> NIL) DO
        Node^.Methods^.SetAttributeBit (Node, TypeThroughEnable, FALSE);

MatchView^.Methods^.SetObject (MatchView, AnObject(Node));
        SubView[1]^.Methods^.GetTitle (MatchView, Name);
        Upshift (Name);

IF (LengthOf(Name) > 0) THEN
            SetCodeBits (MatchCodeSet, ORD(Name[1]), ORD(Name[1]), TRUE);
        END;

IF (Node^.Methods^.ChildrenVisible (Node)) THEN
            Node := Node^.Methods^.NextPreOrder (Node);
        ELSE
            Node := Node^.Methods^.GetNext (Node);
        END;
    END;
    MatchCount := 0;
    SetLengthOf (MatchString, 0);
END;

END OutlineViewResetMatching;

PROCEDURE OutlineViewFindChar    (OutlineView    : XOutlineView;
                                  MatchChar      : CHAR        )
                                                               : BOOLEAN;
CONST
    BitsPerBitSet    = 16;
VAR
    Code             : ACode;
    Backup           : BOOLEAN;
    FirstKey         : BOOLEAN;
    Node             : ATreeNode;
    OldCursorNode    : ATreeNode;
    ParentNode       : ATreeNode;
    Name             : ARRAY [0..80] OF CHAR;
    Result           : CARDINAL;
    Found            : BOOLEAN;

BEGIN (*<DEBUGGING*)
    IF (AnxietyLevel > Calm) THEN
        ValidateOutlineView(AnOutlineView(OutlineView));
    END;
    (*DEBUGGING>*)

WITH OutlineView^ DO
        IF (NOT TypeThroughEnabled) THEN
            RETURN FALSE;
        END;

Code := ORD (CAP (MatchChar));
        IF NOT ((Code MOD BitsPerBitSet) IN
                MatchCodeSet[Code DIV BitsPerBitSet]) THEN
            RETURN FALSE;
        END;
        MatchCodeSet := EmptyCodeSet;

Backup := (Code = BackSpace);
        FirstKey := (MatchCount = 0);
```

```
IF (Backup) THEN
    DEC (MatchCount);
ELSE
    INC (MatchCount);
    MatchString[MatchCount] := MatchChar;
END;
SetLengthOf (MatchString, MatchCount);
Upshift (MatchString);

IF (Backup) THEN
    Node := ViewObject^.Methods^.GetFirst (ViewObject);
ELSE
    Node := ViewObject^.Methods^.GetFirstVisible (ViewObject);
END;

OldCursorNode := Methods^.GetCursorNode (AnOutlineView(OutlineView));
Found := FALSE;
WHILE (Node <> NIL) DO IF (FirstKey) THEN
        Node^.Methods^.SetAttributeBit (Node, TypeThroughEnable, TRUE);
    ELSIF (Backup) AND (MatchCount = 0) THEN
        Node^.Methods^.SetAttributeBit (Node, TypeThroughEnable, FALSE);
    END;

MatchView^.Methods^.SetObject (MatchView, AnObject(Node));
    SubView[1]^.Methods^.GetTitle (MatchView, Name);
    Upshift (Name);
    Result := ABS (Compare (MatchString, Name));

IF (Result > MatchCount) THEN
        SetCodeBits (MatchCodeSet, ORD(Name[Result]), ORD(Name[Result]), TRUE);
    END;

IF (Result = 0) OR (Result > MatchCount) THEN
        Node^.Methods^.SetAttributeBit (Node, SelfMatch, TRUE);
        Found := TRUE;
        ParentNode := Node^.Methods^.Parent (Node);
        WHILE (ParentNode <> NIL) DO
            ParentNode^.Methods^.SetAttributeBit (ParentNode, ChildrenMatch, TRUE);
            ParentNode := ParentNode^.Methods^.Parent (ParentNode);
        END;
    ELSE
        Node^.Methods^.SetAttributeBit (Node, SelfMatch, FALSE);
        Node^.Methods^.SetAttributeBit (Node, ChildrenMatch, FALSE);
    END;

IF (Backup) THEN
        Node := Node^.Methods^.NextPreOrder (Node);
    ELSE
        Node := Node^.Methods^.NextForDisplay (Node);
    END;
END;

Node := ViewObject^.Methods^.GetFirstVisible (ViewObject);
OutlineView^.Methods^.SetFirst (AnOutlineView(OutlineView), Node);

(* Now try to find a node to set the cursor on *)

IF (MatchCount > 0) THEN
    WHILE (NOT Node^.Methods^.TestAttributeBit (Node, SelfMatch)) DO
        Node := Node^.Methods^.NextForDisplay (Node);
    END;
END;

IF (Backup) THEN
    Node := OldCursorNode;
END;
OutlineView^.Methods^.SetCursorNode (AnOutlineView(OutlineView), Node);
```

```
IF (Found) AND (MatchCount > 0) THEN
    SetCodeBits (MatchCodeSet, BackSpace, BackSpace, TRUE);
END;

END;
RETURN Found;
END OutlineViewFindChar;
```

I claim:

1. A method for selecting a desired option from among a plurality of hierarchical menu options comprising the computer-implemented steps of:

defining said hierarchical menu options as a plurality of branches and sub-branches, each of said branches and sub-branches containing at leas one of said hierarchical menu options, each of said sub-branches descending from an option in a branch;

displaying on a display said defined hierarchical menu options;

designating a first fragment which is a portion of the desired option;

identifying a first subset of options consisting only of those hierarchical menu options containing said first fragment from the plurality of hierarchical menu options across all branches and sub-branches of said hierarchical menu options;

displaying on the display each hierarchical menu option that belongs to said first subset of options on each hierarchical menu option that has in any of its sub-branches an option from said first subset of options;

deleting from the display each hierarchical menu option that both does not belong to said first subset of options, and does not have an option from said first subset of options included in any sub-branches that descend from said deleted option;

designating a second fragment which is another portion of the desired option;

identifying a second subset of options consisting only of those hierarchical menu options containing both said first fragment and said second fragment across all branches and sub-branches of said hierarchical menu options;

displaying on the display each hierarchical menu option that belongs to said second subset of options, and reach hierarchical menu option that has in any of its sub-branches an option from said second subset of options;

deleting from the display each hierarchical menu option that both does not belong to said second subset of options, and does not have an option from said second subset of options included in any sub-branches that descend from said deleted option; and selecting the desired option from the display second subset of options.

2. The method of claim 1 wherein said first and second subsets of options are displayed with the portions of each option which correspond to the fragments entered prior thereto being displayed in a visually distinct manner form the remaining portions of each of said options; and accepting a selection signal for selecting one of the displayed options.

3. The method of claim 2 wherein said visually distinct manner comprises displaying said fragments is bold.

4. The method of claim 2 wherein said visually distinct manner comprises displaying said fragments capitalized.

5. The method of claim 2 wherein said visually distinct manner comprises displaying said fragments in a different video mode.

6. The method of claim 2 wherein said visually distinct manner comprises displaying said fragments in a different font.

7. The method according to claim 1 comprising the steps of:

a) designating an auxiliary fragment which is still another portion of the desired option;

b) identifying an auxiliary subset of said set of options that includes all hierarchical menu options containing said first and second and auxiliary fragments;

c) displaying on the display each hierarchical menu option that belongs to said auxiliary subset of options, and each hierarchical menu optional that has in any of its sub-branches an option from said auxiliary subset of options;

d) deleting from the display each hierarchical menu option that both does not belong to said auxiliary subset of options, and does not have an option from said auxiliary subset of options included in any sub-branches that descend from said deleted option; and e) selecting the desired option from the displayed auxiliary subset of options.

8. The method of claim 7 wherein said deletion steps include compressing said hierarchical menu to fill in spaces left by said deleted options.

9. The method of claim 1 wherein said deletion steps include compressing said hierarchical menu to fill in spaces left by said deleted options.

10. The method according to claim 7 wherein said steps a) through e) are repeated.

11. The method according to claim 1 wherein said first fragment is the left-most significant fragment of the desired option; and said second fragment is the next left-most significant fragment of the desired option.

12. The method according to claim 1 wherein the set of options are organized into an outline having headings and subheadings corresponding to groups within the set of options; and wherein in the steps of displaying, a subheading is displayed which corresponds to a subset of an identified option.

13. The method according to claim 12 comprising the step of:

displaying the heading which corresponds to each displayed subheading.

14. The method according to claim 1 wherein the step of selecting includes positioning a cursor on one of the displayed subsets of options at a location on the display corresponding to the desired option.

15. The method of claim 1 further comprising the step of deleting a fragment from the set of fragments which have been designated and displaying the subset of options corresponding to the remaining fragments which were not deleted.

16. A method for selecting a desired option from among a plurality of hierarchical menu options comprising the computer-implemented steps of:

defining said hierarchical menu options as a plurality of branches and sub-branches, each of said branches and sub-branches containing at least one hierarchical menu option, each of said sub-branches descending from an option in a branch;

displaying on a display said defined hierarchical menu options;

designating a first fragment which is a portion of the desired option;

identifying a first subset of options consisting only of those hierarchical menu options containing said first fragment from said hierarchical menu options across all branches and sub-branches of said hierarchical menu options;

displaying on the display a plurality of displayed options of said first subset of options, whereby said first fragment portion of each displayed option of said first subset of options is displayed in a visually distinct manner;

designating a second fragment which is another portion of the desired option;

identifying a second subset of options consisting only of those hierarchical menu options containing both said first fragment and said second fragment from across all branches and sub-branches of said hierarchical menu options;

displaying on the display a plurality of displayed options of said second subset of options, whereby said first and second fragment portions of each displayed option of said second subset of options are displayed in a visually distinct manner; and selecting the desired option from the displayed options of said second subset of options.

17. The method of claim 16 wherein said visually distinct manner comprises displaying said fragments in bold.

18. The method of claim 16 wherein said visually distinct manner comprises displaying said fragment capitalized.

19. The method of claim 16 wherein said visually distinct manner comprises displaying said fragments in a different video mode.

20. The method of claim 16 wherein said visually distinct manner comprises displaying said fragments in a different font.

* * * * *